Figure 1:
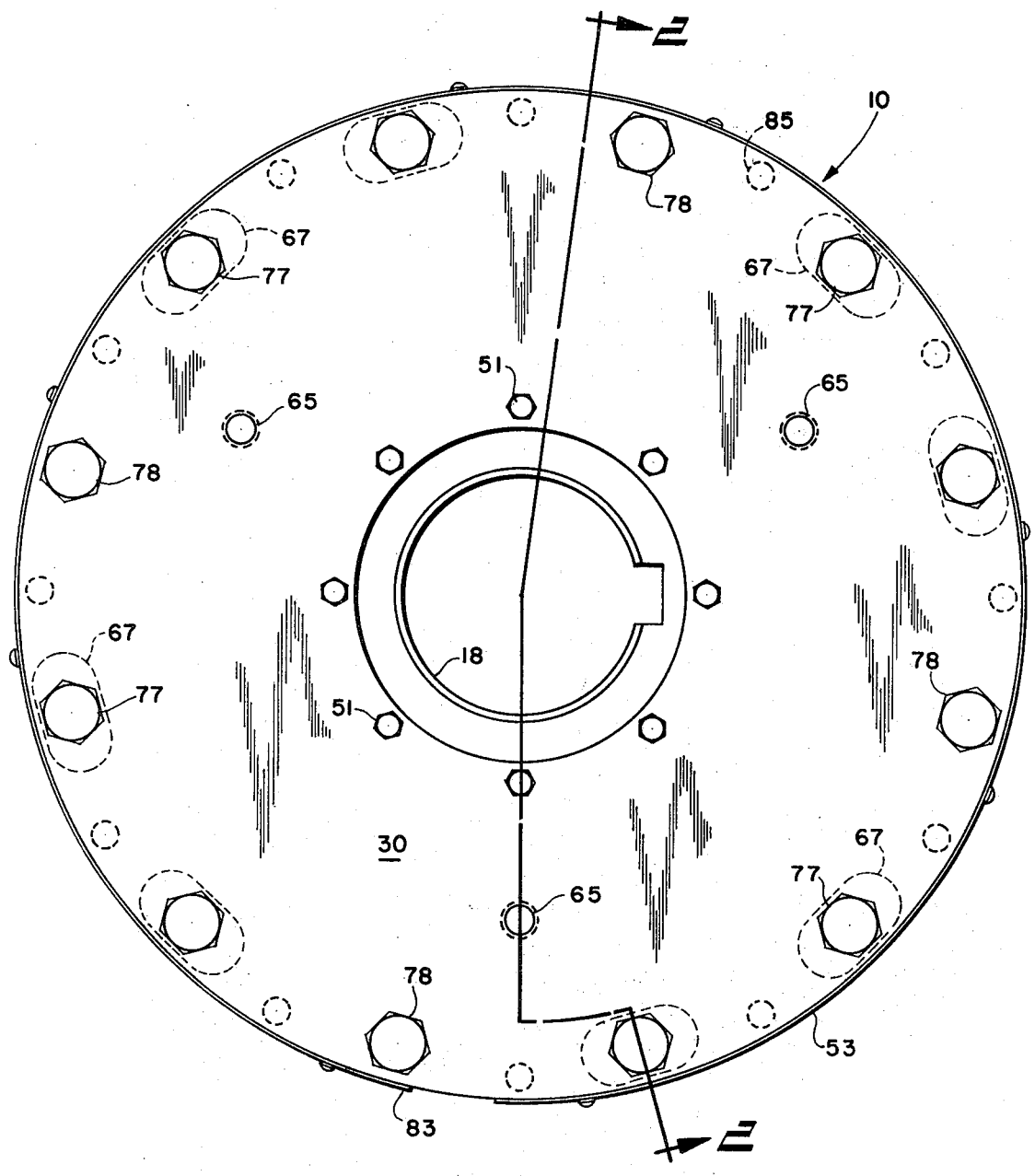

United States Patent
Collins

[11] 3,862,678
[45] Jan. 28, 1975

[54] COOLED COUPLING WITH DISC STOPS

[75] Inventor: Marcus Howard Collins, Akron, Ohio

[73] Assignee: Eaton Corporation, Cleveland, Ohio

[22] Filed: Aug. 2, 1973

[21] Appl. No.: 384,998

[52] U.S. Cl......... 192/88 A, 192/70.19, 192/113 B, 188/366, 188/264 D
[51] Int. Cl............................................. F16d 25/04
[58] Field of Search......... 192/85 AA, 88 A, 113 B, 192/70.19, 70.2, 18 A, 70.28; 188/71.6, 72.3, 72.4, 366, 264 D

[56] References Cited
UNITED STATES PATENTS

| | | | |
|---|---|---|---|
| 1,831,083 | 11/1931 | Stock | 192/88 A |
| 2,360,489 | 10/1944 | Gillett | 192/85 AA |
| 2,435,936 | 4/1969 | Warman | 192/88 A |
| 2,675,106 | 4/1954 | Foster | 192/88 A X |
| 2,934,178 | 4/1960 | Eaton | 192/113 B X |
| 3,530,965 | 9/1970 | Wilson | 192/113 B |
| 3,572,477 | 3/1971 | Ewart | 192/113 B |

*Primary Examiner*—Benjamin W. Wyche
*Attorney, Agent, or Firm*—Teagno & Toddy

[57] ABSTRACT

A fluid cooled, torque transmitting device of the disc type is provided with a tube-type spacer arrangement which permits integrated assembly of the device thus obviating the need for an external housing. The device includes a preferably annular end plate carrying a diaphragm, an annular reaction member movable by the diaphragm and an annular fixed reaction member. Rotatably disposed between the reaction members is a disc member splined to a hollow gear member which in turn is keyed to a shaft.

A like plurality of circumferentially oriented openings positioned radially outboard of the disc is provided in both reaction members and end plate. Spacers extend through the openings in the movable reaction member and through each spacer extends a bolt to securely clamp the fixed reaction member and end plate between each spacer. Selective spacers carry springs to return the mechanism to its unactuated position and other spacers carry a stop arrangement which automatically prevents failure of the device when the friction lining of the disc becomes excessively worn.

10 Claims, 2 Drawing Figures

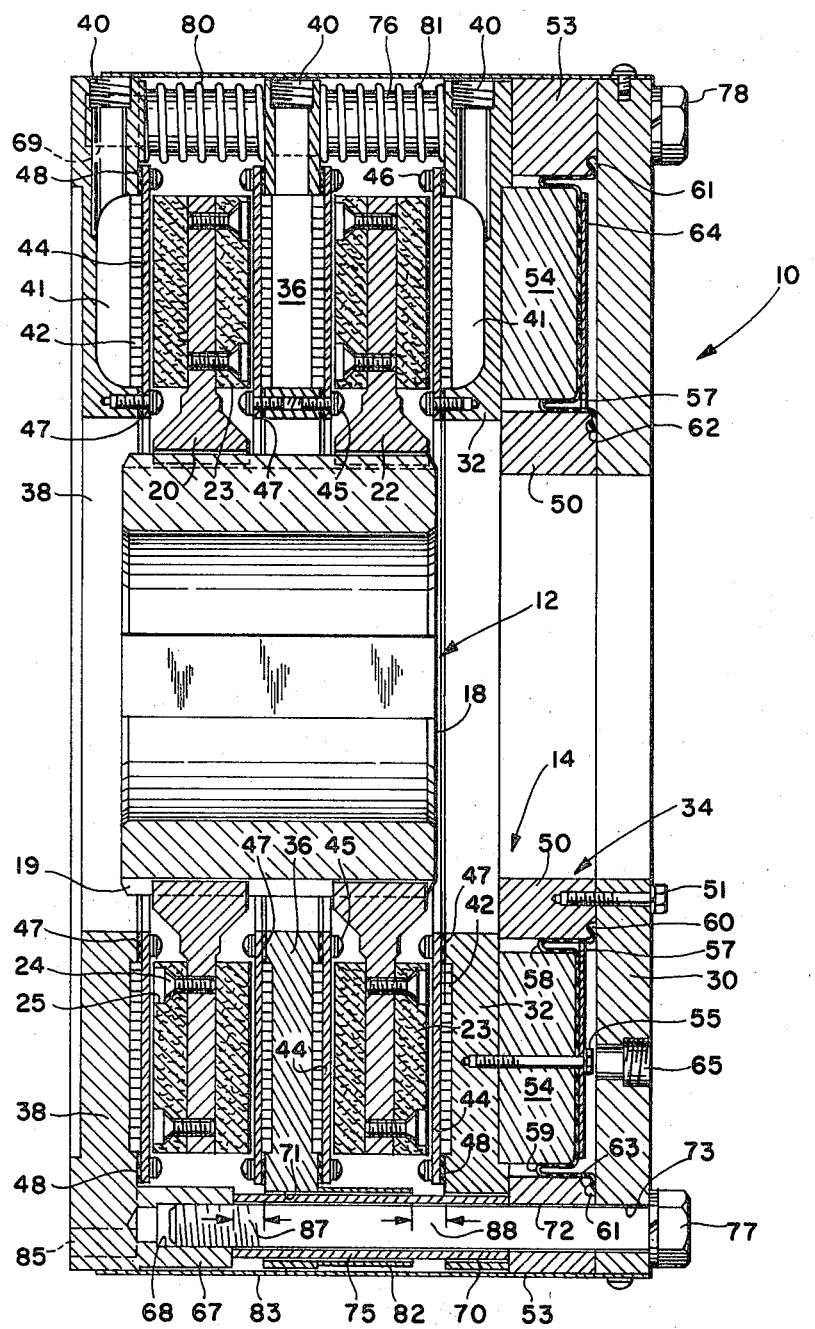

COOLED COUPLING WITH DISC STOPS

This invention relates generally to fluid cooled, torque transmitting devices of the disc type and more particularly to several improved component parts and the assembly thereof.

The invention is particularly applicable to a water cooled, dual disc brake and will be described with particular reference thereto. However it will be appreciated by those skilled in the art that the invention in its broader sense may be applicable to any disc type, torque transmitting device whether of the wet or dry type and more specifically will encompass air cooled, torque transmitting devices of the dry type.

Torque transmitting devices of the disc type are known in the art and generally comprise an external housing which carries and positions annular axially movable and fixed reaction members having a disc therebetween. An actuating member such as piston, diaphragm, magnetic means or the like and most commonly a tube in water type brakes biases the movable reaction member against the disc to frictionally engage same between the reaction members. Heretofore the housing design, itself, prevented interchangeability of similar component parts between different brake designs and significantly increased the cost of each brake. Additionally the housing contained no provision to prevent brake actuation when the friction linings had been worn to their replacement state and the device thus required constant visual checks to determine when replacement or repair was needed.

If the friction lining wear continued beyond permissible wear limits, the actuating mechanism such as a tube commonly employed in such clutches became excessively distended and tube failure occurred. Furthermore, the capacity of the brake decreased as the lining wear increased, because the biasing area of the tube decreased as the tube travel increased and accordingly the diaphragm biasing force was reduced.

It is thus an object of the subject invention to provide an improved, fluid cooled, torque transmitting device which overcomes all of the above-noted deficiencies.

This object along with other features of the subject invention is achieved in a fluid cooled, torque transmitting device such as a clutch or a brake comprising relatively rotatable first and second assemblies adapted to be coupled to one another when the device is actuated. The first assembly includes a radially extending, axially movable disc member having a central opening in splined engagement with the exterior of an annular gear member which in turn is keyed to a rotatable shaft. The second assembly includes an annular fixed reaction member positioned on one side of the disc member and an annular movable reaction member located on the other disc side. An annular fixed end plate carries an actuating member, such as a diaphragm arrangement for biasing the movable reaction member and disc member against the fixed reaction member whereby the first assembly is frictionally coupled to the second assembly.

A like plurality of circumferentially spaced openings in the end plate and reaction members are provided for securing the component parts of the device into an assembly without the need of an external housing and the openings are spaced radially outboard of the disc member to permit an increase in friction lining area. A tube-type spacer extends through each opening in the movable reaction member and the end plate and fixed reaction member are clamped between the spacers by a like plurality of bolts extending through the openings. A first plurality of selective tube-type spacers carries springs positioned between the movable and fixed reaction members for biasing the movable reaction member and the diaphragm into their unactuated positions. A second plurality of selective spacers carries a like number of stop tubes which prevent movement of the movable reaction member after a predetermined amount of travel has occurred. The fixed travel distance corresponds to the maximum permissible wear of the friction linings secured to the disc members and thus prevents brake failure when wear has exceeded the maximum amount by metal to metal contact, over extension of the actuating member or the like.

The invention is especially suited for those friction devices utilizing a diaphragm of the convoluted type. Accordingly the diaphragm arrangement includes inner and outer rings clamped between the end plate and movable reaction member with the outer ring having a like plurality of circumferentially orientated openings for receiving the clamping bolts. Disposed between the inner and outer rings is an annular diaphragm block secured at one side to the movable reaction member. A convoluted diaphragm abuts the other side of the diaphragm block with its convolutions extending between the spaces provided between the diaphragm block and the inner and outer rings to provide a constant biasing force independent of diaphragm travel.

In accordance with still another feature of the subject invention, each reaction member has an annular array of water flow cavities opening to the side of each reaction member adjacent the friction lining of the disc. An annular, relatively thin, heat conductive alloyed copper wear plate covers each cavity array and is secured to the reaction members by a first row of radially spaced fasteners inboard of the friction lining and a second row of radially spaced fasteners outboard of the friction lining. A first annular inner gasket and a second annular outer gasket between the copper plate and the reaction member seals the flow cavity. The gasket material comprises an asbestos composition which permits the gasket material to retain its sealing characteristics at high temperatures and further acts as a compensating means to prevent tensile failure of fasteners which heretofore occurred because of the uncompensated disproportionate heat expansion rates between the fasteners and copper plate.

It is thus another object of the subject invention to provide in a fluid cooled, torque transmitting device of the disc type, an improved assembly which eliminates the need of an external housing while also providing means for positively preventing actuating of the device when a critical wear level of component parts has occurred.

It is still another object of the subject invention to provide in a fluid cooled, torque transmitting device of the disc type improved actuating means which exert a constant biasing force on component parts therein which are adapted to be frictionally coupled together.

It is yet another object of the subject invention to provide in a water cooled, torque transmitting device of the disc type improved water sealing means which insure against failure of the device.

The invention may take physical form in certain parts and arrangement of parts, a preferred embodiment of which will be described in detail herein and illustrated in the accompanying drawings which form a part hereof and wherein:

FIG. 1 is an end view of the torque transmitting device of the subject invention; and FIG. 2 is a side elevation view in section taken along Line 2—2 of FIG. 1.

Referring now to the drawings wherein the showings are for the purpose of illustrating a preferred embodiment of the invention only and not for the purpose of limiting same, there is shown in FIGS. 1 and 2 a water cooled brake 10 of the dual disc type, the term "brake" being used as a descriptive term rather than a limiting term and intended to include those devices commonly known as "clutches" wherein the "output member" is free to drivingly rotate. Brake 10 includes relatively rotatable first and second assemblies 12,14 respectively which are adapted to be coupled to one another when the brake is actuated; first assembly 12 shown herein as being rotatable and second assembly 14 understood to be fixed.

First assembly 12 includes a rotatable input shaft (not shown) keyed to an annular gear member 18. Annular gear member 18 is splined about its exterior as at 19 and receives in splined engagement therewith first and second radially extending disc members 20,22 which are thus free to move axially with respect to gear member 18. Secured to each side of each disc 20,22 is an annular lining of friction material herein referred to an annular friction disc 23 which is preferably formed from a known teflon impregnated friction material although other known friction materials may be used. Each frication disc 23 is secured to its respective disc member 20,22 by a plurality of flat-head screws 24 extending through countersunk holes 25 in each friction disc 23 and received in threaded engagement with holes in each disc member. While the friction discs could be bonded to their respective disc members, the fastening arrangement shown herein permits easy replacement of the friction discs when worn.

Second assembly 14 includes an annular fixed end plate 30; a first annular movable reaction member 32 adjacent one side of second disc member 22; a diaphragm arrangement 34 between first movable reaction member 32 and fixed end plate 30 for biasing first movable reaction member 32; a second annular movable reaction member 36 between opposing sides of first and second disc members 20,22 and a fixed annular reaction member 38 spaced from second movable reaction member 36 and adjacent a side of first disc member 20. Each reaction member 32,36,38 is shown to be of a known water cooled type and includes an outlet fitting opening 40 leading to a slot-like outlet cavity 41 which in turn communicates with an annular or a ring-shaped array of flow cavities 42. Flow cavities 42 are in effect spaces between pimples cast onto each reaction member's surface in an annular array which is shown extending radially a distance equal to the radial distance of the annular friction disc 23; each annular flow cavity array 42 adjacent a friction disc 23 and two such arrays shown formed in the second movable reaction member 36. Not shown is a slot-like inlet cavity and return fitting opening which are located diametrically opposite the inlet fitting opening and inlet cavity 40,41.

Each annular array of flow cavities 42 is closed by an annular, relatively-thin heat conductive alloyed copper wear plate 44 and the term copper as used herein shall constitute all suitable copper based alloys as known to those skilled in the art. Each wear plate 44 is secured to its respective reaction member by a first plurality of fasteners 45 extending through plate 44 into the reaction member and arranged in a radially spaced row inboard of each friction disc 23. A second plurality of fasteners 46 arranged in a radially spaced row outboard of each friction disc likewise extends through the wear plate into threaded engagement with the reaction member to secure the outer edge of the wear plate. An inner annular gasket 47 and an outer annular gasket 48 respectively compressed by the first and second plurality of fasteners 45,46 is provided to seal each array of flow cavities 42. Each gasket is preferably formed from a known nitrile-butadiene asbestos material because of the heat characteristics of that material.

Diaphragm arrangement 34 includes an inner clamp ring 50 positioned between first movable reaction member 32 and end plate 30 and secured to end plate 30 by a plurality (8) of cap screws 51 extending through end plate 30 into threaded engagement with inner clamp ring 50. An outer clamp ring 53 concentric with inner clamp ring 50 and outboard of disc members 20,22 is likewise positioned between end plate 30 and first movable reaction member 32. Between inner and outer clamp rings 50,53 is an annular diaphragm retainer block 54 which is positioned in registry with a circular indent in first movable reaction member 32 by a plurality of hex-head screws 55. Retainer block 54 is of shorter axial length than the clamp rings and equally spaced therebetween. An annular diaphragm 57 with ring-shaped convolutions 58,59 extending within the annular spaces between diaphragm block 54 and inner and outer clamp rings 50,53 respectively is sealed by being compressed between end plate 30 and inner and outer clamp rings 50,53. Diaphragm 57 abuts diaphragm retainer block 54 and is held thereagainst by an annular diaphragm retainer plate 64 affixed to diaphragm block 54 by hex-head screws 55. Inlet openings 65 in end plate 30 are provided to port fluid under pressure into diaphragm 57. It will, of course, be obvious to those skilled in the art that in a broader sense of the invention other known actuating mechanisms such as piston means, magnetic means, etc. may be substituted for diaphragm arrangement 34.

To provide a means for assembling brake 10 a first plurality (8) of circumferentially orientated bosses 67 extending radially outboard of the friction discs 23 is provided in fixed reaction member 38 and each boss has a tapped blind opening 68 therein. Intermittently spaced between bosses 67 is a second plurality (4) of tapped holes 69. First and second movable reaction members 32,36, outer clamp ring 53 and end plate 30, each have a third plurality of openings 70,71,72,73 respectively equal in number to the total of the first and second tapped holes 68,69 and likewise circumferentially orientated and extending radially outboard of the friction discs 23.

Extending loosely through openings 70,71 in the movable reaction members 32,36 are a first plurality (8) of short tube-type spacers 75 which abut the first plurality of bosses 67 and the outer clamp ring 53. Likewise extending loosely through openings 70,71 in movable reaction members 32,36 is a second plurality (4) of longer length spacers 76. Long length spacers abut at one end and fixed reaction member 38 adjacent the second plurality of tapped holes 69 and at their other ends abut outer clamp ring 53 adjacent openings 72 therein. Spacers 75,76 may be chromed if desired to prevent rusting and improve wear characteristics.

A first plurality (8) of cap screws 77 extend through openings 72,73 in the outer clamp ring and end plate and through the first plurality of spacers 75 into threaded engagement with the first plurality of tapped holes 68. A second plurality (4) of longer length cap screws 78 extend through other openings 72,73 in the end plate and outer clamp ring through the longer length spacers 76 into threaded engagement with the second plurality of tapped holes 69 in the fixed reaction member. Cap screws 77,78 thus secure the assembly together.

Each long length spacer tube 76 carries a first spring 80 between fixed reaction member 38 and second movable reaction member 36 and a second spring 81 between second movable reaction member 36 and first movable reaction member 32 for centering the first and second assemblies 12,14 when the brake is unactuated. Each short length spacer tube 75 carries a stop tube 82 of predetermined length positioned between the first and second movable reaction members 32,36 for reasons which will be explained hereafter.

The brake 10 thus described may be furnished with a circular, sheet metal safety shroud 83 fixed to the end plate 30 and fixed reaction member 38. The brake is adapted to be mounted to a fixed support (not shown) by a plurality of mounting screws in threaded engagement with mounting holes 85 provided in the rear of fixed reaction member 38.

In operation, braking is achieved by introducing fluid under pressure through inlet openings 65 into diaphragm 57 which maintains a constant biasing force against diaphragm block 54 independent of its travel because of its convoluted configuration. Diaphragm 57 thus biases member 32 into contact with friction disc 23 at one side of the second disc member 22 and forces disc member 22 to move relative to input gear member 18 by its splined connection into contact with the second movable reaction member 36. The first movable reaction member 32, second disc member 22 and second movable reaction member 36 continue travel until second movable reaction member 36 contacts the friction disc 23 on the first disc member 20 and forces friction disc 23 on the opposite side of first disc member 20 into contact with the fixed reaction member 38. In actual operation all such movement occurs in a continuous and almost simultaneous manner and friction generated between friction discs 23 and copper wear plates 44 brings relatively rotatable first assembly 12 to a stop. When fluid pressure is released, springs 80,81 return the aforementioned components into their spring-biased normally unactuated position.

During braking, the heat generated by frictional engagement between friction discs 23 and wear plates 44 is dissipated by the water cooled arrangement noted above. Particular problems have heretofore been experienced with such arrangements. O-rings were previously used to seal copper wear plates 44 and the heat generated was high enough (200° – 600°F) to cause a set in the O-ring material which in turn resulted in leakage through the seal. Failure also occurred by the wear plates 42 expanding due to heat in a uncompensated manner relative to the fasteners 47,48 which stressed the fasteners to failure. Further aggravating both types of failure is that the copper wear plates are furnished in an "as supplied condition" with wrinkles or rills therein which act as heat sinks. Tests have indicated that both types of failure are prevented if copper wear plates 44 are sealed to their reaction members by gaskets 47,48 of the subject invention even if the rills formed in wear plates 44 are not removed. Failure due to leakage is prevented because the gasket material retains its sealing capability at temperatures up to 700° – 800°F. Fastener failure is alleviated by gaskets 47,48 acting as compensation means to permit expansion of the wear plate 42 relative to fasteners 47,48 without unduly stressing the fasteners.

When the brake of the subject invention is unactuated, a first clearance 87 exists along the short length spacers between each boss 67 and the second movable reaction member 36 and a second clearance 88 exists between the end of each stop tube 82 and the first movable reaction member 32. Clearances 87,88 are shown in the embodiment as being equal to one another and are sized to equal the total travel of the second assembly 14 plus the maximum wear permissible for all friction discs 23. Thus when the friction discs 23 are worn to their maximum permissible limit, the second rotatable assembly 14 will take up clearances 87,88 and go solid against the aforementioned stops and in this connection it should be noted that the aforementioned multiple disc arrangement necessarily results in substantially equal wear rates for all friction discs. Thus there is no longer any need for a constant visual check of the friction discs to determine when same should be replaced and failures of the diaphragm and possibly the water cool arrangement because of excessive lining wear are prevented.

As noted above, the general spacer tube arrangement thus defined not only eliminates the need of an external housing to retain the parts in relation therewith but also promotes interchangeability of component parts between different brake units. Thus many of the component parts which draw up a single disc water cooled brake can be used in a dual disc water cooled brake. Similarly, modularity can now be achieved by designing certain components, such as diaphragm 57 to be a standard part whether used in a single or multiple disc brake. Additionally the tube-type, spring-spacer arrangement being outboard of disc members 20,22 permits the friction disc material to extend radially outwardly a distance further than that of other commercially acceptable brakes. Thus the capacity of the brake has been significantly increased by the tube-type arrangement shown herein. Finally the movable reaction members by virtue of their loose fit with respect to the tube-type spacers 75,76 possess a tendency to skew and assume the attitude of the disc members 20,22 and this feature is believed, on the basis of actual testing, to significantly aid the effectiveness of brake 10 during its break-in period while also promoting longer wear of the friction discs. A further advantage of the spacer tube arrangement is that adjustment to the brake during operation is not required as contrasted to other commercially acceptable brakes which require removal of shims to give greater travel of the actuating member and correspondingly permit additional wear of the friction lining.

The invention has been described with reference to a preferred embodiment. Obviously modifications and alterations will occur to others upon reading and understanding the specification. It is my intention to include all such modifications and alterations insofar as they come within the scope of the present invention.

It is thus the essence of the subject invention to provide a fluid cooled, torque transmitting device which materially aids in the operation of such device while extensively simplifying the structure thereof.

Having thus defined the invention, I claim:

1. A fluid cooled, torque transmitting device comprising:

relatively rotatable first and second assemblies adapted to be coupled to one another when said device is actuated;

said first assembly including a radially extending disc member having an opening extending centrally therethrough and an annular gear member in splined engagement with said disc member about its exterior periphery whereby said disc member may move axially with respect to said gear member and said gear member adapted to receive and be keyed to a shaft member extending therethrough;

said second assembly including a relatively fixed end plate and a diaphragm type actuating member secured thereto, a relatively movable reaction member biased by said actuating member, and a relatively fixed reaction member spaced from said movable reaction member, said disc member extending between said reaction members; and said end plate and said reaction members having central apertures extending therethrough sufficient to receive said shaft;

said end plate and said reaction members being generally annular in configuration and having a like plurality of radially spaced, circumferentially orientated openings extending therethrough, said openings positioned outboard said disc member, a like plurality of tube-type spacers extending through said openings in said movable reaction member and positioned between opposing end faces of said fixed reaction member and said end plate, and a like plurality of bolts extending through said spacers for permanently clamping said spacers between said fixed reaction member and said end plate, a first spring carried on each one of a plurality of first selective spacers and positioned between said fixed and movable reaction member for biasing said diaphragm to a return position; and a stop tube received over each one of a plurality of second selective spacers, each stop tube located between said reaction members and having a predetermined axial length shorter than the length of its associated spacer to restrain movement of said movable reaction member after said movable member has reached a predetermined travel.

2. The torque transmitting device of claim 1 further including a second disc member axially spaced from said first disc member and similarly splined to said annular gear member;

an annular second relatively movable reaction member positioned between said first and second disc members and having a like plurality of radially spaced, circumferentially orientated openings receiving said spacers, means securing said first mentioned movable reaction member to said actuating member for common movement therewith;

a second spring carried on each one of said first plurality of spacers between said first and second movable reaction members, said first springs being positioned between said fixed and first movable reaction members;

said fixed reaction member having a plurality of radially spaced, circumferentially orientated bosses outboard of said disc members and of number equal said plurality of second spacers, each boss having an opening therein for receiving one of said bolts and spaced from said second movable reaction member a first predetermined distance to define a stop therebetween; and each one of said stop tubes positioned between said first and second movable members a second predetermined distance to define a stop therebetween.

3. The torque transmitting device of claim 2 wherein said first and second predetermined distances are equal and said first and second reaction members loosely receive said spacer tubes through said openings therein.

4. The torque transmitting device of claim 3 wherein said actuating member includes piston means for biasing said movable reaction members.

5. The torque transmitting device of claim 3 further including an annular inner clamp ring inboard of said disc members and between said first movable reaction member and said end plate;

an annular outer clamp ring outboard of said disc members between said first movable reaction member and said end plate and having a plurality of openings extending therethrough which receive said bolts;

an annular diaphragm block between said inner and outer clamp rings and secured to said first movable reaction member; and a convoluted diaphragm between said diaphragm block and end plate and associated fitting means through said end plate for providing fluid communication to said diaphragm.

6. The torque transmitting device of claim 5 wherein said device is adapted to be liquid cooled;

said first and second discs have friction material secured to their sides extending between said reaction members;

said reaction members have an annular array of water flow cavities opening to the sides of said reaction members adjacent said disc members;

an annular heat conductive plate covering each cavity array and secured by fasteners threaded into said reaction members, said fasteners extending in a first radially spaced, circumferentially orientated row inboard of said friction material and a second radially spaced, circumferentially orientated row outboard of said friction material, and a first annular inner gasket between each plate and each reaction member compressed by said first row of threaded fasteners and a second annular outer gasket between each plate and each reaction member compressed by second row of threaded fasteners; and said gaskets being formed of nitrile-butadiene asbestos material.

7. The torque transmitting device of claim 6 wherein said device is water cooled and said friction material includes a teflon impregnated lining.

8. A liquid cooled, torque transmitting device comprising:
   a relatively-rotatable input shaft;
   an annular gear member receiving said input shaft in key relation therewith and having at least one spline extending along its outer periphery;
   first and second radially outwardly extending disc members having a splined opening extending centrally therethrough, said disc members receiving said annular gear member and in splined relation therewith, each disc member having an annular facing of friction material secured to each radially extending side thereof;
   an annular, relatively-fixed reaction member adjacent one side of said first disc member;
   a first relatively movable, annular reaction member adjacent the other side of said first disc member and adjacent a side of said second disc member;
   a second relatively movable annular reaction member adjacent the other side of said second disc member;
   a relatively fixed end plate spaced from said second movable reaction member;
   actuating means between said end plate and said second reaction member for biasing said movable reaction members into frictional engagement with said disc members;
   said fixed reaction member having a first plurality of circumferentially spaced bosses outboard of said disc members with a first plurality of blind tapped holes therein, said fixed reaction member further having a second plurality of similarly aligned blind tapped holes inbetween said bosses, said end plate, first and second movable reaction members having a plurality of holes equal in number to said first and second plurality of holes in said end plate extending therethrough and circumferentially orientated thereabout outboard of said disc members;
   a first plurality of tube-type spacers equal in number to said first plurality of holes positioned between said bosses and said end plate,
   a second plurality of tube-type spacers equal in number to said second plurality of holes positioned between said fixed reaction member and said end plate,
   respective first and second pluralities of bolts extending through said end plate, said first and second tube-type spacers received in threaded engagement with said tapped holes in said fixed member;
   a tube stop positioned over each second plurality of tube spacers between said first and second reaction members to define a predetermined unimpeded travel distance between said first and second reaction members, and
   said boss and said first reaction member likewise defining an identically sized predetermined travel distance between said boss and said first reaction member.

9. The water cooled clutch of claim 8 wherein
   said actuating means comprises diaphragm means and said diaphragm means includes an annular inner clamping ring inboard of said disc member between said second movable reaction member and said end plate;
   an annular outer clamping ring outboard of said disc member between said second movable reaction member and said end plate and having a plurality of openings extending therethrough to receive said bolts;
   an annular diaphragm block between said inner and outer clamping rings and secured to said second movable reaction member, and
   a convoluted diaphragm between said diaphragm block and end plate.

10. The clutch mechanism of claim 8 wherein
   said reaction members have an annular array of water flow cavities opening to the sides of said reaction members adjacent said disc members;
   an annular heat conductive plate covering each cavity array and secured by fasteners threaded into said reaction members, said fasteners extending in a first radially spaced, circumferentially orientated row inboard of said annular facing of friction material and a second radially spaced, circumferentially orientated row outboard of said annular facing of friction material,
   a first inner gasket between each plate and each reaction member compressed by said first row of threaded fasteners and a second annular gasket between each plate and each reaction member compressed by second row of threaded fasteners, and
   said gaskets being formed of nitrile-butadiene asbestos material.

* * * * *